United States Patent
Tanaka

(10) Patent No.: US 12,082,634 B2
(45) Date of Patent: Sep. 10, 2024

(54) GLOVE

(71) Applicant: DIC Corporation, Tokyo (JP)

(72) Inventor: Hiroki Tanaka, Takaishi (JP)

(73) Assignee: DIC Corporation, Tokyo (JP)

( * ) Notice: Subject to any disclaimer, the term of this patent is extended or adjusted under 35 U.S.C. 154(b) by 624 days.

(21) Appl. No.: 17/295,154

(22) PCT Filed: Dec. 3, 2019

(86) PCT No.: PCT/JP2019/047143
§ 371 (c)(1),
(2) Date: May 19, 2021

(87) PCT Pub. No.: WO2020/116419
PCT Pub. Date: Jun. 11, 2020

(65) Prior Publication Data
US 2022/0015477 A1    Jan. 20, 2022

(30) Foreign Application Priority Data

Dec. 7, 2018 (JP) .................................. 2018-229929
Dec. 7, 2018 (JP) .................................. 2018-229930

(51) Int. Cl.
| | | |
|---|---|---|
| *A41D 19/00* | (2006.01) | |
| *C08G 18/08* | (2006.01) | |
| *C08G 18/32* | (2006.01) | |
| *C08G 18/40* | (2006.01) | |
| *C08G 18/48* | (2006.01) | |
| *C08G 18/76* | (2006.01) | |
| *C09D 175/08* | (2006.01) | |

(52) U.S. Cl.
CPC ..... *A41D 19/0055* (2013.01); *C08G 18/0823* (2013.01); *C08G 18/3206* (2013.01); *C08G 18/4018* (2013.01); *C08G 18/4812* (2013.01); *C08G 18/7671* (2013.01); *C09D 175/08* (2013.01)

(58) Field of Classification Search
CPC .............. A41D 19/015; A41D 19/0055; A41D 19/0006; C08G 18/3206; C08G 18/4018; C08G 18/4812; C08G 18/4829; C08G 18/6625; C08G 18/4854; C08G 18/0823; C08G 18/348; C08G 18/44; C08G 18/7671; C09D 175/08
See application file for complete search history.

(56) References Cited

U.S. PATENT DOCUMENTS

| | | |
|---|---|---|
| 2003/0220463 A1 | 11/2003 | Bechara et al. |
| 2005/0066414 A1 | 3/2005 | Yu et al. |
| 2011/0201715 A1 | 8/2011 | Schoenberger et al. |
| 2013/0225755 A1 | 8/2013 | Snow |

FOREIGN PATENT DOCUMENTS

| | | |
|---|---|---|
| CN | 103189408 A | 7/2013 |
| JP | 2005-504136 A | 2/2005 |
| JP | 2005-526889 A | 9/2005 |
| JP | 2012-500869 A | 1/2012 |
| JP | 2016-176040 A | 10/2016 |
| TW | 201503842 A | 2/2015 |
| WO | 2010095665 A1 | 8/2010 |
| WO | 2012068059 A1 | 5/2012 |
| WO | 2014038565 A1 | 3/2014 |

OTHER PUBLICATIONS

Supplementary European Search Report dated Jan. 7, 2022, issued for European Patent Application No. 19894240.1.
Office Action mailed Jun. 2, 2022, issued for Chinese Patent Application No. 201980080748.8 and English translation thereof.

*Primary Examiner* — John M Cooney
(74) *Attorney, Agent, or Firm* — Locke Lord LLP; James E. Armstrong, IV; Nicholas J. DiCeglie, Jr.

(57) ABSTRACT

The present invention provides a glove having a coating formed of a urethane resin composition including a urethane resin (A) and water (B). The urethane resin (A) is produced using a polycarbonate polyol (a1-1) as a raw material. The coating has a 500% modulus of 7 MPa or less. Example urethane resins used as the urethane resin (A) preferably include: a urethane resin produced using a polycarbonate polyol (a1-1) and polytetramethylene glycol (a1-2) as raw materials at a specified mass ratio; and/or a urethane resin produced using a polycarbonate polyol (a1-1) and a compound (a1-4) as raw materials at a specified mass ratio, the compound (a1-4) having a number average molecular weight of less than 500, a branched structure, and 2 to 4 hydroxyl groups.

4 Claims, No Drawings

GLOVE

TECHNICAL FIELD

The present invention relates to a glove having a coating formed of a urethane resin composition containing water.

BACKGROUND ART

Examples of common rubber used as a material having rubber elasticity include natural rubber, isoprene rubber, chloroprene rubber, and nitrile rubber. When these kinds of rubber are used for gloves, problems of allergy caused by protein contained in natural rubber and allergy caused by a vulcanizing agent or a vulcanization accelerator used for rubber in general, including the above-mentioned kinds of rubber, sometimes arise.

Therefore, it is promising to use a urethane resin having rubber elasticity and not containing the above-mentioned substances, as an alternative material to the above-mentioned kinds of rubber. In the processing of gloves, rubber latex has been widely used, hence the substitution of urethane dispersion (for example, in which a urethane resin is dispersed in water) that can be used in the same production facility as that for rubber latex is particularly promising.

High flexibility and high chemical resistance to alcohols and the likes are required of the gloves, in particular, medical gloves. For the urethane dispersion for the gloves, for example, a method of enhancing a chemical resistance by introducing a polyester polyol or a polycarbonate polyol is effective (for example, see PTL 1). However, the polyester polyol is inferior in hydrolysis resistance, and the polycarbonate polyol causes curing of a coating. As described above, a material having both high flexibility and high chemical resistance has not been devised yet.

CITATION LIST

Patent Literature

PTL 1: Japanese Unexamined Patent Application Publication (Translation of PCT Application) No. 2005-526889

SUMMARY OF INVENTION

Technical Problem

An object of the present invention is to provide a glove having flexibility and chemical resistance (in particular, alcohol resistance) by using a urethane resin containing water.

Solution to Problem

The present invention provides a glove having a coating formed of a urethane resin composition including a urethane resin (A) and water (B), in which the urethane resin (A) is produced using a polycarbonate polyol (a1-1) as a raw material, and the coating has a 500% modulus of 7 MPa or less.

Advantageous Effects of Invention

The glove according to the present invention has both high flexibility and high chemical resistance (in particular, high alcohol resistance). Furthermore, since the urethane resin composition containing water is used for the glove, the environmental load during the production of the glove is low. Therefore, the glove according to the present invention can be preferably used as an industrial glove used in various fields, such as the chemical industry field, the food field, and the medical field. In particular, the glove can be preferably used as a medical glove.

DESCRIPTION OF EMBODIMENTS

A glove according to the present invention has a coating formed of a urethane resin composition including a urethane resin (A) and water (B).

The urethane resin (A) is, for example, dispersible in water (B) described later. Examples of the urethane resin (A) that can be used include: a urethane resin having a hydrophilic group, such as an anionic group, a cationic group, or a nonionic group; and a urethane resin forcibly dispersed in water (B) by using an emulsifier. These urethane resins (A) may be used alone or in combination of two or more. From the viewpoint of ease of emulsification, a urethane resin having a hydrophilic group is preferably used. Furthermore, from the viewpoint of ease of glove processing, a urethane resin having an anionic group is more preferably used.

Examples of a method for obtaining the urethane resin having an anionic group include a method using, as a raw material, one or more compounds selected from the group consisting of a compound having a carboxyl group and a compound having a sulfonyl group.

Examples of the usable compound having a carboxyl group include 2,2-dimethylolpropionic acid, 2,2-dimethylolbutanoic acid, 2,2-dimethylolbutyric acid, and 2,2'-valeric acid. These compounds may be used alone or in combination of two or more.

Examples of the usable compound having a sulfonyl group include: 3,4-diaminobutanesulfonic acid, 3,6-diamino-2-toluenesulfonic acid, 2,6-diaminobenzenesulfonic acid, N-(2-aminoethyl)-2-aminosulfonic acid, N-(2-aminoethyl)-2-aminoethylsulfonic acid, N-2-aminoethane-2-aminosulfonic acid, and N-(2-aminoethyl)-β-alanine; and salts thereof. These compounds may be used alone or in combination of two or more.

In the urethane resin composition, part or all of the carboxyl group and the sulfonyl group may be neutralized with a basic compound. Examples of the basic compound that can be used include: ammonia, organic amines, such as triethylamine, pyridine, and morpholine; alkanolamines, such as monoethanolamine and dimethylethanolamine; and metal basic compounds containing sodium, potassium, lithium, or calcium.

Examples of a method for obtaining the urethane resin having a cationic group include a method using one or two or more compounds having an amino group as raw materials.

Examples of the usable compound having an amino group include: compounds having a primary or secondary amino group, such as triethylenetetramine and diethylenetriamine; and compounds having a tertiary amino group, such as N-alkyldialkanolamines including N-methyldiethanolamine and N-ethyldiethanolamine, and N-alkyldiaminoalkylamines including N-methyldiaminoethylamine and N-ethyldiaminoethylamine. These compounds may be used alone or in combination of two or more.

Examples of a method for obtaining the urethane resin having a nonionic group include a method using one or two or more compounds having an oxyethylene structure as raw materials.

Examples of the usable compound having an oxyethylene structure include polyether polyols having an oxyethylene structure, such as polyoxyethylene glycol, polyoxyethylene polyoxypropylene glycol, and polyoxyethylene polyoxytetramethylene glycol. These compounds may be used alone or in combination of two or more.

Examples of the emulsifier that can be used to obtain the aqueous urethane resin forcibly dispersed in water (B) include: nonionic emulsifiers, such as polyoxyethylene nonylphenyl ether, polyoxyethylene lauryl ether, polyoxyethylene styrylphenyl ether, polyoxyethylene sorbitol tetraoleate, and polyoxyethylene-polyoxypropylene copolymers; anionic emulsifiers, such as fatty acid salts including sodium oleate, alkyl sulfates, alkyl benzenesulfonates, alkyl sulfosuccinates, naphthalene sulfonates, polyoxyethylene alkyl sulfates, sodium alkane sulfonates, and sodium alkyl diphenyl ether sulfonates; and cationic emulsifiers, such as alkyl amine salts, alkyl trimethyl ammonium salts, and alkyl dimethyl benzyl ammonium salts. These emulsifiers may be used alone or in combination of two or more.

Specific example urethane resins used as the urethane resin (A) preferably include: a urethane resin (AX) produced using a polycarbonate polyol (a1-1) and polytetramethylene glycol (a1-2) as raw materials and having a mass ratio [(a1-1)/(a1-2)] of 50/50 to 95/5; and/or a urethane resin (AY) produced using a polycarbonate polyol (a1-1) and/or a compound (a1-4) and having a mass ratio [(a1-1)/(a1-4)] of 93/7 to 99.5/0.5, the compound (a1-4) having a number average molecular weight of less than 500, a branched structure, and 2 to 4 hydroxyl groups.

The urethane resin (AX) will be described first.

As the urethane resin (AX), specifically, a reaction product of a polyol (a1X), a polyisocyanate (a2X), a chain extender (a3X), and, if necessary, a raw material for producing the urethane resin having a hydrophilic group can be used.

From the viewpoint of achieving still higher flexibility and still higher chemical resistance, as the polyol (a1X), the polycarbonate polyol (a1-1) and the polytetramethylene glycol (a1-2) are preferably used at a mass ratio [(a1-1)/(a1-2)] of 50/50 to 95/5. Such a range of the mass ratio allows both higher flexibility and higher chemical resistance to be achieved. From the viewpoint of achieving still higher flexibility and still higher chemical resistance, the mass ratio is more preferably within a range of 60/40 to 90/10.

From the viewpoint of achieving still higher flexibility and still higher chemical resistance, the number average molecular weight of each of the polycarbonate polyol (a1-1) and the polytetramethylene glycol (a1-2) is preferably within a range of 500 to 10,000, and more preferably within a range of 1,000 to 5,000. Note that the number average molecular weight of each of the polycarbonate polyol (a1-1) and the polytetramethylene glycol (a1-2) is a value determined by gel permeation chromatography (GPC).

Examples of the polycarbonate polyol (a1-1) that can be used include a reaction product of carbonate and/or phosgene and a compound having two or more hydroxyl groups.

Examples of the carbonate that can be used include dimethyl carbonate, diethyl carbonate, diphenyl carbonate, ethylene carbonate, and propylene carbonate. These compounds may be used alone or in combination of two or more.

Examples of the usable compound having two or more hydroxyl groups include ethylene glycol, propylene glycol, 1,3-propanediol, 1,4-butanediol, 1,3-butanediol, 1,2-butanediol, 2-methyl-1,3-propanediol, 1,5-pentanediol, neopentyl glycol, 1,6-hexanediol, 1,5-hexanediol, 3-methyl-1,5-pentanediol, 1,7-heptanediol, 1,8-octanediol, 1,9-nonanediol, 1,8-nonanediol, 2-ethyl-2-butyl-1,3-propanediol, 1,10-decanediol, 1,12-dodecanediol, 1,4-cyclohexanedimethanol, 1,3-cyclohexanedimethanol, trimethylolpropane, trimethylolethane, and glycerin. These compounds may be used alone or in combination of two or more. From the viewpoint of achieving still higher chemical resistance, of these compounds, one or more compounds selected from the group consisting of 1,4-butanediol, 1,5-pentanediol, and 1,6-hexanediol are preferably used, and a combination of 1,5-pentanediol and 1,6-hexanediol is more preferably used.

As the polyol (a1X), besides the above-mentioned polyols, other polyols can be used, if necessary. Examples of the other polyols that can be used include: a compound (a1-3) having an average number of hydroxyl groups per molecule of more than 2 and 3.5 or less, other than the (a1-1) and the (a1-2); and polyether polyol, polyester polyol, polybutadiene polyol, hydrogenated polybutadiene polyol, polyacrylic polyol, and castor oil, other than the (a1-1), the (a1-2) and the (a1-3). These polyols may be used alone or in combination of two or more.

Of the above-mentioned polyols, the compound (a1-3) having an average number of hydroxyl groups of more than 2 and 3.5 or less is preferably used from the viewpoint of ease of emulsification even when the urethane resin (AX) has a small number of hydrophilic groups.

Examples of the compound (a1-3) that can be used include: polyether triol; castor oil; and trimethylolpropane, trimethylolethane, and glycerin. These compounds may be used alone or in combination of two or more. From the viewpoint of achieving still higher emulsifiability, of these compounds, one or more compounds selected from the group consisting of polyether triol, castor oil, and trimethylolpropane are preferably used, and polyether triol is more preferably used.

Examples of the polyether triol that can be used include: an adduct of glycerin and propylene oxide; an adduct obtained by adding propylene oxide to glycerin serving as an initiator and then adding ethyne oxide to an end of the resultant; a reaction product of glycerin, propylene oxide, and ethylene oxide, such as an adduct obtained by adding a mixture of propylene oxide and ethylene oxide to glycerin serving as an initiator; an adduct of trimethylolpropane and propylene oxide; an adduct obtained by adding propylene oxide to trimethylolpropane serving as an initiator and then adding ethyne oxide to an end of the resultant; and a reaction product of trimethylolpropane, propylene oxide, and ethylene oxide, such as an adduct obtained by adding a mixture of propylene oxide and ethylene oxide to trimethylolpropane serving as an initiator. These polyether triols may be used alone or in combination of two or more. From the viewpoint of achieving still higher emulsifiability, of these polyether triols, an adduct of glycerin and propylene oxide and/or an adduct of trimethylolpropane and propylene oxide are preferably used.

When the compound (a1-3) is used, the amount of the compound (a1-3) used is preferably within a range of 0.1% to 40% by mass, and more preferably within a range of 5% to 30% by mass in the polyol (a1X).

The number average molecular weight of the polyether triol is preferably within a range of 500 to 30,000, and more preferably within a range of 3,000 to 8,000. Note that the number average molecular weight of the polyether triol is a value determined by gel permeation chromatography (GPC).

Examples of the polyisocyanate (a2X) that can used include: aromatic polyisocyanates, such as phenylene diisocyanate, tolylene diisocyanate, diphenylmethane diisocyanate, naphthalene diisocyanate, polymethylene polyphenyl polyisocyanate, and carbodiimidated diphenylmethane polyisocyanate; and aliphatic or alicyclic polyisocyanates, such as hexamethylene diisocyanate, lysine diisocyanate, cyclohexane diisocyanate, isophorone diisocyanate, dicyclohexylmethane diisocyanate, xylylene diisocyanate, tetramethylxylylene diisocyanate, dimer acid diisocyanate, and norbornene diisocyanate. These polyisocyanates may be used alone or in combination of two or more. From the viewpoint of achieving still higher chemical resistance, of these polyisocyanates, aromatic polyisocyanates are preferably used, and diphenylmethane diisocyanate is more preferably used.

Examples of the chain extender (a3X) that can be used include: chain extenders having an amino group, such as ethylenediamine, 1,2-propanediamine, 1,6-hexamethylenediamine, piperazine, 2,5-dimethylpiperazine, isophoronediamine, 1,2-cyclohexanediamine, 1,3-cyclohexanediamine, 1,4-cyclohexanediamine, 4,4'-dicyclohexylmethanediamine, 3,3'-dimethyl-4,4'-dicyclohexylmethanediamine, hydrazine, and diethylenetriamine; and chain extenders having a hydroxyl group, such as ethylene glycol, diethylene glycol, triethylene glycol, propylene glycol, dipropylene glycol, 1,3-propanediol, 1,3-butanediol, 1,4-butanediol, hexamethylene glycol, saccharose, methylene glycol, glycerin, sorbitol, bisphenol A, 4,4'-dihydroxydiphenyl, 4,4'-dihydroxydiphenyl ether, and trimethylolpropane. These chain extenders may be used alone or in combination of two or more. From the viewpoint of achieving still higher chemical resistance, of these chain extenders, chain extenders not having a branched structure are preferably used, and chain extenders having a hydroxyl group are more preferably used, and ethylene glycol is particularly preferably used.

Examples of a method for producing the urethane resin (AX) include: a production method in which, in the absence of a solvent or in the presence of an organic solvent, the polyol (a1X), the polyisocyanate (a2X), the chain extender (a3X), and a raw material for producing the urethane resin having a hydrophilic group are mixed and the resultant mixture is allowed to react at 50° C. to 100° C. for 3 to 20 hours; and a production method in which, in the absence of a solvent or in the presence of an organic solvent, the polyol (a1X), the polyisocyanate (a2X), and a raw material for producing the urethane resin having a hydrophilic group are mixed and the resultant mixture is allowed to react at 50° C. to 100° C. for 3 to 15 hours to obtain a urethane prepolymer having an isocyanate group, and substantially the urethane prepolymer and the chain extender (a3X) are allowed to react. Note that, in the case where an organic solvent is used for the above-described reactions, the organic solvent is preferably finally removed by evaporation.

Examples of the organic solvent that can be used for producing the urethane resin (AX) include: ketone solvents, such as acetone and methyl ethyl ketone; ether solvents, such as tetrahydrofuran and dioxane; acetate solvents, such as ethyl acetate and butyl acetate; nitrile solvents, such as acetonitrile; and amide solvents, such as dimethylformamide and N-methylpyrrolidone. The organic solvents may be used alone or in combination of two or more.

From the viewpoint of achieving a urethane resin having still higher dispersion stability and a comparatively high concentration, the average particle diameter of the urethane resin (AX) is preferably within a range of 0.05 to 1 μm, and more preferably within a range of 0.10 to 0.7 μm. Note that a method for measuring the average particle diameter of the urethane resin (AX) will be described in Examples.

From the viewpoint of enhancing preservability and workability, the content of the urethane resin (AX) in the urethane resin composition is preferably within a range of 10% to 60% by mass, and more preferably within a range of 20% to 50% by mass.

Next, the urethane resin (AY) will be described.

As the urethane resin (AY), specifically, a reaction product of a polyol (a1Y), a polyisocyanate (a2Y), and, if necessary, a raw material for producing the urethane resin having a hydrophilic group can be used.

As the polyol (a1Y), the polycarbonate polyol (a1-1) and the compound (a1-4) having a number average molecular weight of less than 500, a branched structure, and 2 to 4 hydroxyl groups are preferably used at a mass ratio [(a1-1)/(a1-4)] of 93/7 to 99.5/0.5. The flexibility of urethane resin can be achieved when the flexibility of a polymer main chain is high and the crystallinity of polymer chains is low. Although the urethane resin would be normally cured due to the polycarbonate polyol, with such a range of the mass ratio, the crystallinity of a urethane bonding site becomes lower and the flexibility is given owing to the branched structure of the (a1-4), and at the same time, chemical resistance is given to the polymer main chain due to the urethane bond and the polycarbonate polyol, and also it can be avoided that a too large amount of the (a1-4) causes an increase in the number of the urethane bonds and the urethane bonds themselves cure the polymer main chain to offset the effect of making the crystallinity lower. Thus, both higher flexibility and higher chemical resistance can be achieved. From the viewpoint of achieving still higher flexibility and still higher chemical resistance, the mass ratio is preferably within a range of 95/5 to 99/1.

As the polycarbonate polyol (a1-1), the same as what can be used for the urethane resin (AX) can be used. The number average molecular weight of the compound (a1-2) is a calculated value when it can be calculated from the structural formula of the compound (a1-2), whereas the number average molecular weight of the compound (a1-2) is a value measured in the same manner as for the (a1-1) when it cannot be calculated from the structural formula.

Examples of the compound (a1-4) that can be used include 2-methyl-1,5-pentanediol, 3-methyl-1,5-pentanediol, 2,2,4-trimethyl-1,3-pentanediol, 1,2-butanediol, 1,3-butanediol, 2-butyl-2-ethyl-1,3-propanediol, 1,2-propanediol, 2-methyl-1,3-propanediol, neopentyl glycol, 2-isopropyl-1,4-butanediol, 2,4-dimethyl-1,5-pentanediol, 2,4-diethyl-1,5-pentanediol, 2-ethyl-1,3-hexanediol, 2-ethyl-1,6-hexanediol, 3,5-heptanediol, 2-methyl-1,8-octanediol, and trimethylolpropane. These compounds may be used alone or in combination of two or more. From the viewpoint of achieving still higher flexibility and still higher chemical resistance, of these compounds, one or more compounds selected from the group consisting of 2-methyl-1,5-pentanediol, 3-methyl-1,5-pentanediol, 2,2,4-trimethyl-1,3-pentanediol, 1,2-butanediol, 1,3-butanediol, 2-butyl-2-ethyl-1,3-propanediol, 1,2-propanediol, 2-methyl-1,3-propanediol, neopentyl glycol, and trimethylolpropane are preferably used, and one or more compounds selected from the group consisting of neopentyl glycol, 1,3-butanediol, and 3-methyl-1,5-pentanediol are more preferably used.

As the polyol (a1Y), besides the above-mentioned polyols, other polyols can be used if necessary. Examples of the other polyols that can be used include polyether polyol, polyester polyol, polybutadiene polyol, hydrogenated polybutadiene polyol, and polyacrylic polyol. These polyols may be used alone or in combination of two or more. However, as the polyol (a1Y), polytetramethylene glycol is not preferably used.

Furthermore, a chain extender having a number average molecular weight of less than 500, other than the (a1-4), can be used together. Examples of the chain extender that can be used include: chain extenders having an amino group, such as ethylenediamine, 1,2-propanediamine, 1,6-hexamethylenediamine, piperazine, 2,5-dimethylpiperazine, isophoronediamine, 1,2-cyclohexanediamine, 1,3-cyclohexanediamine, 1,4-cyclohexanediamine, 4,4'-dicyclohexylmethanediamine, 3,3'-dimethyl-4,4'-dicyclohexylmethanediamine, and hydrazine; and chain extenders having a hydroxyl group, such as ethylene glycol, diethylene glycol, triethylene glycol, propylene glycol, dipropylene glycol, 1,3-propanediol, 1,3-butanediol, 1,4-butanediol, hexamethylene glycol, saccharose, methylene glycol, bisphenol A, 4,4'-dihydroxydiphenyl, and 4,4'-dihydroxydiphenyl ether. These chain extenders may be used alone or in combination of two or more.

Examples of the polyisocyanate (a2Y) that can be used include: aromatic polyisocyanates, such as phenylene diisocyanate, tolylene diisocyanate, diphenylmethane diisocyanate, naphthalene diisocyanate, polymethylene polyphenyl polyisocyanate, and carbodiimidated diphenylmethane polyisocyanate; and aliphatic or alicyclic polyisocyanates, such as hexamethylene diisocyanate, lysine diisocyanate, cyclohexane diisocyanate, isophorone diisocyanate, dicyclohexylmethane diisocyanate, xylylene diisocyanate, tetramethylxylylene diisocyanate, dimer acid diisocyanate, and norbornene diisocyanate. These polyisocyanates may be used alone or in combination of two or more. From the viewpoint of achieving still higher chemical resistance, of these polyisocyanates, aromatic polyisocyanates are preferably used, and diphenylmethane diisocyanate is more preferably used.

Examples of a method for producing the urethane resin (AY) include a production method in which, in the absence of a solvent or in the presence of an organic solvent, the polyol (a1Y), the polyisocyanate (a2Y), and a raw material for producing the urethane resin having a hydrophilic group are mixed and the resultant mixture is allowed to react at 50° C. to 100° C. for 3 to 20 hours. Note that, in the case where an organic solvent is used for the reaction, the organic solvent is preferably finally removed by evaporation.

Examples of the organic solvent that can be used for producing the urethane resin (AY) include: ketone solvents, such as acetone and methyl ethyl ketone; ether solvents, such as tetrahydrofuran and dioxane; acetate solvents, such as ethyl acetate and butyl acetate; nitrile solvents, such as acetonitrile; and amide solvents, such as dimethylformamide and N-methylpyrrolidone. The organic solvents may be used alone or in combination of two or more.

From the viewpoint of achieving a urethane resin having still higher dispersion stability and a comparatively high concentration, the average particle diameter of the urethane resin (AY) is preferably within a range of 0.05 to 1 μm, and more preferably within a range of 0.10 to 0.7 μm. Note that a method for measuring the average particle diameter of the urethane resin (AY) will be described in Examples.

From the viewpoint of enhancing preservability and workability, the content of the urethane resin (AY) in the urethane resin composition is preferably within a range of 10% to 60% by mass, and more preferably within a range of 20% to 50% by mass.

Examples of the water (B) that can be used include distilled water and ion-exchange water. These types of water may be used alone or in combination of two or more.

From the viewpoint of enhancing preservability and workability, the content of the water (B) in the aqueous urethane resin composition is preferably within a range of 30% to 85% by mass, and more preferably within a range of 45% to 75% by mass.

The urethane resin composition used in the present invention includes the urethane resin (A) and the water (B) as essential components, and may include other additives, if necessary.

Examples of the other additives that can be used include a thickener, an antifoaming agent, a urethanization catalyst, a silane coupling agent, a filler, a thixotropic agent, a tackifier, a wax, a heat stabilizer, a light-resistant stabilizer, a fluorescent whitening agent, a foaming agent, a foam stabilizer, a pigment, a dye, a conductivity imparting agent, an antistatic agent, a moisture permeability improver, a water repellent, an oil repellent, an anti-blocking agent, and a hydrolysis inhibitor. These additives may be used alone or in a combination of two or more.

The levels of durability and flexibility required for the urethane resin composition used in the present invention vary, depending on usage, and therefore, the urethane resin composition may include, for example, a styrene-butadiene copolymer (SBR), a butadiene copolymer (BR), an isoprene copolymer (IR), an ethylene-propylene-diene terpolymer (EPDM), a chloroprene polymer (CR), an acrylonitrile-butadiene copolymer (NBR), a butyl polymer (IIR), or natural rubber (NR).

The urethane resin composition used in the present invention is applicable not only to gloves, but also medical tubes such as a catheter, and contraceptives.

Examples of a method for producing a glove having a coating formed of the urethane resin composition include a method in which, first, a hand mold, a tube mold, or the like is immersed in a coagulant described later and then dried, if necessary, to cause a metal salt and the like contained in the coagulant to adhere to a surface of the hand mold or the like, and subsequently, the hand mold or the like is immersed in the urethane resin composition, and subsequently, the surface is washed with water and dried to produce a glove having a coating coagulated on the surface of the hand mold or the like. At this time, the urethane resin composition may be further diluted with, for example, distilled water or ion exchange water.

Examples of the coagulant that can be used include: solutions of metal salts, such as calcium nitrate, calcium chloride, zinc nitrate, zinc chloride, magnesium acetate, aluminum sulfate, and sodium chloride; and solutions of acids, such as formic acid and acetic acid. Examples of a solvent that can dissolve the metal salts and the acids may include water, methanol, ethanol, and isopropanol. The content of the metal salt contained in the coagulant is preferably within a range of 1% to 50% by mass with respect to the total amount of the coagulant. The amount of time to immerse the application target in the coagulant is, for example, 1 to 10 minutes. The coagulant can be used at a temperature of 5° C. to 60° C.

When immersed in the coagulant, the hand mold or the tube mold may have the normal temperature or may be heated to 30° C. to 70° C.

Alternatively, a glove-shaped or tube-shaped object formed of an item knitted with nylon fibers or the like may be fitted into the hand mold or the tube mold in advance. Specifically, first, the hand mold or the like into which the glove-shaped object formed of the knitted item has been fitted is immersed in the coagulant, and then dried if necessary, and thus the glove-shaped object or the like is impregnated with the coagulant. Next, the hand mold or the like is immersed in the urethane resin composition, and then the surface of the hand mold or the like is washed with water and dried, so that a glove or the like including a coating solidified on the surface of the glove-shaped object or the like is formed. Then, when the glove or the like is peeled off from the hand mold and the glove-shaped object or the like to obtain the glove or the like formed of the solidified coating having a shape corresponding to the hand mold or the like. The tube can also be produced in the same manner as above, except that the tube mold and the tube-shaped object formed of the item knitted with nylon fibers or the like are used.

The knitted item is not limited to the item knitted with nylon fibers, and the knitted item can be an item knitted, for example, with polyester fibers, aramid fibers, polyethylene fibers, or cotton. Alternatively, instead of the knitted item, a woven fabric made of the above-mentioned fibers can also be used. Alternatively, instead of the knitted item, a glove-shaped object and a tube-shaped object that are made of a resin material, such as vinyl chloride, natural rubber, or synthetic rubber, can also be used.

As described above, the glove according to the present invention has both high flexibility and high chemical resistance (in particular, high alcohol resistance). Furthermore, since the water-containing urethane resin composition is used, the environmental load during the production of the glove is low. Therefore, the glove according to the present invention can be preferably used as an industrial glove used in various fields, such as the chemical industry field, the food field, and the medical field. In particular, the glove can be preferably used as a medical glove.

The glove according to the present invention is excellent in flexibility, and the coating formed of the urethane resin composition preferably has a 500% modulus of 7 MPa or less, and more preferably has a 500% modulus of 1 to 6 MPa.

EXAMPLES

Hereinafter, the present invention will be described in more detail by way of Examples.

Example 1

<Preparation of Urethane Resin Composition>

In a vessel equipped with a thermometer, a nitrogen gas introduction tube, and a stirrer and purged with nitrogen, 600 parts by mass of polycarbonate polyol (produced using 1,5-pentanediol and 1,6-hexanediol as raw materials, number average molecular weight: 2,000, hereinafter abbreviated as "PC"), 33 parts by mass of polytetramethylene glycol (number average molecular weight: 2,000, hereinafter abbreviated as "PTMG"), 181 parts by mass of polypropylenetriol (an adduct of glycerin and propylene oxide, number average molecular weight: 6,000, hereinafter abbreviated as "3fPPG"), 8.4 parts by mass of ethylene glycol (hereinafter abbreviated as "EG"), 15.8 parts by mass of 2,2-dimethylolpropionic acid (hereinafter abbreviated as "DMPA"), 154 parts by mass of 4,4'-diphenylmethane diisocyanate (hereinafter abbreviated as "MDI"), and 991 parts by mass of methyl ethyl ketone were allowed to react at 70° C.

At the time when the viscosity of the resultant reactant reached a specified viscosity, 1.0 part by mass of methanol was added to the reactant and the mixture was stirred for 1 hour, and then the reaction was terminated, and furthermore, 498 parts by mass of methyl ethyl ketone was added as a dilution solvent thereto to obtain an organic solvent solution of a urethane resin.

Subsequently, 9.6 parts by mass of a 48% by mass potassium hydroxide solution was added as a neutralizer to the organic solvent solution of the urethane resin to neutralize a carboxyl group of the urethane resin, and furthermore, 2,480 parts by mass of water was added thereto and the mixture was stirred to obtain a water dispersion of the urethane resin. Subsequently, the water dispersion of the urethane resin was desolvated to obtain a urethane resin composition having a non-volatile content of 45% by mass and an average particle diameter of 0.73 μm.

Example 2

<Preparation of Urethane Resin Composition>

In a vessel equipped with a thermometer, a nitrogen gas introduction tube, and a stirrer and purged with nitrogen, 600 parts by mass of PC, 214 parts by mass of PTMG, 86 parts by mass of 3fPPG, 10.0 parts by mass of EG, 18.7 parts by mass of DMPA, 182 parts by mass of MDI, and 1,111 parts by mass of methyl ethyl ketone were allowed to react at 70° C.

At the time when the viscosity of the resultant reactant reached a specified viscosity, 1.3 parts by mass of methanol was added to the reactant and the mixture was stirred for 1 hour, and then the reaction was terminated, and furthermore, 558 parts by mass of methyl ethyl ketone was added as a dilution solvent thereto to obtain an organic solvent solution of a urethane resin.

Subsequently, 11.4 parts by mass of a 48% by mass potassium hydroxide solution was added as a neutralizer to the organic solvent solution of the urethane resin to neutralize a carboxyl group of the urethane resin, and furthermore, 2,783 parts by mass of water was added thereto and the mixture was stirred to obtain a water dispersion of the urethane resin. Subsequently, the water dispersion of the urethane resin was desolvated to obtain a urethane resin composition having a non-volatile content of 40% by mass and an average particle diameter of 0.33 μm.

Example 3

<Preparation of Urethane Resin Composition>

In a vessel equipped with a thermometer, a nitrogen gas introduction tube, and a stirrer and purged with nitrogen, 600 parts by mass of PC, 313 parts by mass of PTMG, 71 parts by mass of 3fPPG, 11.0 parts by mass of EG, 20.7 parts by mass of DMPA, 202 parts by mass of MDI, and 1,218 parts by mass of methyl ethyl ketone were allowed to react at 70° C.

At the time when the viscosity of the resultant reactant reached a specified viscosity, 1.5 parts by mass of methanol was added to the reactant and the mixture was stirred for 1 hour, and then the reaction was terminated, and furthermore, 612 parts by mass of methyl ethyl ketone was added as a dilution solvent thereto to obtain an organic solvent solution of a urethane resin.

Subsequently, 12.6 parts by mass of a 48% by mass potassium hydroxide solution was added as a neutralizer to the organic solvent solution of the urethane resin to neutralize a carboxyl group of the urethane resin, and furthermore, 3,050 parts by mass of water was added thereto and the mixture was stirred to obtain a water dispersion of the urethane resin. Subsequently, the water dispersion of the urethane resin was desolvated to obtain a urethane resin composition having a non-volatile content of 40% by mass and an average particle diameter of 0.29 μm.

Example 4

<Preparation of Urethane Resin Composition>

In a vessel equipped with a thermometer, a nitrogen gas introduction tube, and a stirrer and purged with nitrogen, 400 parts by mass of PC, 400 parts by mass of PTMG, 41 parts by mass of 3fPPG, 9.6 parts by mass of EG, 17.9 parts by mass of DMPA, 175 parts by mass of MDI, and 1,043 parts by mass of methyl ethyl ketone were allowed to react at 70° C.

At the time when the viscosity of the resultant reactant reached a specified viscosity, 1.3 parts by mass of methanol was added to the reactant and the mixture was stirred for 1 hour, and then the reaction was terminated, and furthermore, 524 parts by mass of methyl ethyl ketone was added as a dilution solvent thereto to obtain an organic solvent solution of a urethane resin.

Subsequently, 10.9 parts by mass of a 48% by mass potassium hydroxide solution was added as a neutralizer to the organic solvent solution of the urethane resin to neutralize a carboxyl group of the urethane resin, and furthermore, 2,612 parts by mass of water was added thereto and the mixture was stirred to obtain a water dispersion of the urethane resin. Subsequently, the water dispersion of the urethane resin was desolvated to obtain a urethane resin composition having a non-volatile content of 40% by mass and an average particle diameter of 0.25 μm.

Example 5

<Preparation of Urethane Resin Composition>

In a vessel equipped with a thermometer, a nitrogen gas introduction tube, and a stirrer and purged with nitrogen, 800 parts by mass of PC, 286 parts by mass of PTMG, 2.6 parts by mass of trimethylolpropane (hereinafter, abbreviated as "TMP"), 13.3 parts by mass of EG, 23.0 parts by mass of DMPA, 240 parts by mass of MDI, and 1,364 parts by mass of methyl ethyl ketone were allowed to react at 70° C.

At the time when the viscosity of the resultant reactant reached a specified viscosity, 1.7 parts by mass of methanol was added to the reactant and the mixture was stirred for 1 hour, and then the reaction was terminated, and furthermore, 686 parts by mass of methyl ethyl ketone was added as a dilution solvent thereto to obtain an organic solvent solution of a urethane resin.

Subsequently, 14.0 parts by mass of a 48% by mass potassium hydroxide solution was added as a neutralizer to the organic solvent solution of the urethane resin to neutralize a carboxyl group of the urethane resin, and furthermore, 3,417 parts by mass of water was added thereto and the mixture was stirred to obtain a water dispersion of the urethane resin. Subsequently, the water dispersion of the urethane resin was desolvated to obtain a urethane resin composition having a non-volatile content of 50% by mass and an average particle diameter of 0.68 μm.

Example 6

<Preparation of Urethane Resin Composition>

In a vessel equipped with a thermometer, a nitrogen gas introduction tube, and a stirrer and purged with nitrogen, 800 parts by mass of PC, 13.5 parts by mass of neopentylglycol (hereinafter, abbreviated as "NPG"), 14.8 parts by mass of DMPA, 160 parts by mass of MDI, and 988 parts by mass of methyl ethyl ketone were allowed to react at 70° C.

At the time when the viscosity of the resultant reactant reached a specified viscosity, 1.2 parts by mass of methanol was added to the reactant and the mixture was stirred for 1 hour, and then the reaction was terminated, and furthermore, 497 parts by mass of methyl ethyl ketone was added as a dilution solvent thereto to obtain an organic solvent solution of a urethane resin.

Subsequently, 9.0 parts by mass of a 48% by mass potassium hydroxide solution was added as a neutralizer to the organic solvent solution of the urethane resin to neutralize a carboxyl group of the urethane resin, and furthermore, 4,961 parts by mass of water was added thereto and the mixture was stirred to obtain a water dispersion of the urethane resin. Subsequently, the water dispersion of the urethane resin was desolvated to obtain a urethane resin composition having a non-volatile content of 40% by mass and an average particle diameter of 0.45 μm.

Example 7

<Preparation of Urethane Resin Composition>

In a vessel equipped with a thermometer, a nitrogen gas introduction tube, and a stirrer and purged with nitrogen, 800 parts by mass of PC, 27.1 parts by mass of NPG, 15.3 parts by mass of DMPA, 194 parts by mass of MDI, and 1,036 parts by mass of methyl ethyl ketone were allowed to react at 70° C.

At the time when the viscosity of the resultant reactant reached a specified viscosity, 1.4 parts by mass of methanol was added to the reactant and the mixture was stirred for 1 hour, and then the reaction was terminated, and furthermore, 521 parts by mass of methyl ethyl ketone was added as a dilution solvent thereto to obtain an organic solvent solution of a urethane resin.

Subsequently, 9.3 parts by mass of a 48% by mass potassium hydroxide solution was added as a neutralizer to the organic solvent solution of the urethane resin to neutralize a carboxyl group of the urethane resin, and furthermore, 5,201 parts by mass of water was added thereto and the mixture was stirred to obtain a water dispersion of the urethane resin. Subsequently, the water dispersion of the urethane resin was desolvated to obtain a urethane resin composition having a non-volatile content of 40% by mass and an average particle diameter of 0.43 μm.

Example 8

<Preparation of Urethane Resin Composition>

In a vessel equipped with a thermometer, a nitrogen gas introduction tube, and a stirrer and purged with nitrogen, 800 parts by mass of PC, 40.6 parts by mass of NPG, 16.1 parts by mass of DMPA, 228 parts by mass of MDI, and 1,084 parts by mass of methyl ethyl ketone were allowed to react at 70° C.

At the time when the viscosity of the resultant reactant reached a specified viscosity, 1.7 parts by mass of methanol was added to the reactant and the mixture was stirred for 1 hour, and then the reaction was terminated, and furthermore, 546 parts by mass of methyl ethyl ketone was added as a dilution solvent thereto to obtain an organic solvent solution of a urethane resin.

Subsequently, 9.8 parts by mass of a 48% by mass potassium hydroxide solution was added as a neutralizer to the organic solvent solution of the urethane resin to neutralize a carboxyl group of the urethane resin, and furthermore, 5,445 parts by mass of water was added thereto and the mixture was stirred to obtain a water dispersion of the urethane resin. Subsequently, the water dispersion of the urethane resin was desolvated to obtain a urethane resin composition having a non-volatile content of 40% by mass and an average particle diameter of 0.40 μm.

Example 9

<Preparation of Urethane Resin Composition>

In a vessel equipped with a thermometer, a nitrogen gas introduction tube, and a stirrer and purged with nitrogen, 800 parts by mass of PC, 11.7 parts by mass of 1,3-butanediol (hereinafter, abbreviated as "1,3BG"), 14.8 parts by mass of DMPA, 160 parts by mass of MDI, and 987 parts by mass of methyl ethyl ketone were allowed to react at 70° C.

At the time when the viscosity of the resultant reactant reached a specified viscosity, 1.2 parts by mass of methanol was added to the reactant and the mixture was stirred for 1 hour, and then the reaction was terminated, and furthermore, 496 parts by mass of methyl ethyl ketone was added as a dilution solvent thereto to obtain an organic solvent solution of a urethane resin.

Subsequently, 9.0 parts by mass of a 48% by mass potassium hydroxide solution was added as a neutralizer to the organic solvent solution of the urethane resin to neutralize a carboxyl group of the urethane resin, and furthermore, 4,951 parts by mass of water was added thereto and the mixture was stirred to obtain a water dispersion of the urethane resin. Subsequently, the water dispersion of the urethane resin was desolvated to obtain a urethane resin composition having a non-volatile content of 40% by mass and an average particle diameter of 0.51 μm.

Example 10

<Preparation of Urethane Resin Composition>

In a vessel equipped with a thermometer, a nitrogen gas introduction tube, and a stirrer and purged with nitrogen, 800 parts by mass of PC, 15.4 parts by mass of 3-methyl-1,5-pentanediol (hereinafter, abbreviated as "MPG"), 14.8 parts by mass of DMPA, 160 parts by mass of MDI, and 990 parts by mass of methyl ethyl ketone were allowed to react at 70° C.

At the time when the viscosity of the resultant reactant reached a specified viscosity, 1.2 parts by mass of methanol was added to the reactant and the mixture was stirred for 1 hour, and then the reaction was terminated, and furthermore, 498 parts by mass of methyl ethyl ketone was added as a dilution solvent thereto to obtain an organic solvent solution of a urethane resin.

Subsequently, 9.0 parts by mass of a 48% by mass potassium hydroxide solution was added as a neutralizer to the organic solvent solution of the urethane resin to neutralize a carboxyl group of the urethane resin, and furthermore, 4,970 parts by mass of water was added thereto and the mixture was stirred to obtain a water dispersion of the urethane resin. Subsequently, the water dispersion of the urethane resin was desolvated to obtain a urethane resin composition having a non-volatile content of 40% by mass and an average particle diameter of 0.56 μm.

Comparative Example 1

<Preparation of Urethane Resin Composition>

In a vessel equipped with a thermometer, a nitrogen gas introduction tube, and a stirrer and purged with nitrogen, 760 parts by mass of PTMG, 80 parts by mass of 3fPPG, 9.3 parts by mass of EG, 17.4 parts by mass of DMPA, 170 parts by mass of MDI, and 1,037 parts by mass of methyl ethyl ketone were allowed to react at 70° C.

At the time when the viscosity of the resultant reactant reached a specified viscosity, 1.6 parts by mass of methanol was added to the reactant and the mixture was stirred for 1 hour, and then the reaction was terminated, and furthermore, 521 parts by mass of methyl ethyl ketone was added as a dilution solvent thereto to obtain an organic solvent solution of a urethane resin.

Subsequently, 10.6 parts by mass of a 48% by mass potassium hydroxide solution was added as a neutralizer to the organic solvent solution of the urethane resin to neutralize a carboxyl group of the urethane resin, and furthermore, 3,417 parts by mass of water was added thereto and the mixture was stirred to obtain a water dispersion of the urethane resin. Subsequently, the water dispersion of the urethane resin was desolvated to obtain a urethane resin composition having a non-volatile content of 40% by mass and an average particle diameter of 0.17 μm.

<Production of Glove>

A glove was produced in accordance with the following procedure.
(1) Immerse a ceramic hand mold in a 10% by mass calcium nitrate solution, and pull out the hand mold therefrom.
(2) Dry the hand mold in (1) at 70° C. for 2 minutes.
(3) Immerse the hand mold in (2) in the urethane resin composition for 5 seconds, and pull out the hand mold therefrom.
(4) Wash the hand mold in (3) with water.
(5) Dry the hand mold in (4) at 70° C. for 20 minutes, and subsequently dry the hand mold at 120° C. for 30 minutes.
(6) Cause baby powder to adhere to the hand mold in (5), and peel off a urethane resin coating from the hand mold.

[Method for Measuring Number Average Molecular Weight]

The number average molecular weight of each of the polyol and others used in the synthesis examples is a value determined by gel permeation chromatography (GPC) under the following conditions.

Measurement Device: High performance GPC ("HLC-8220GPC", manufactured by Tosoh Corporation)
Column: The following columns manufactured by Tosoh Corporation were connected in series and used.
    "TSKgel G5000" (7.8 mm I.D.×30 cm)×1
    "TSKgel G4000" (7.8 mm I.D.×30 cm)×1
    "TSKgel G3000" (7.8 mm I.D.×30 cm)×1
    "TSKgel G2000" (7.8 mm I.D.×30 cm)×1
Detector: RI (differential refractometer)
Column Temperature: 40° C.
Eluent: tetrahydrofuran (THF)
Flow Rate: 1.0 mL/minute
Injection Amount: 100 μL (a tetrahydrofuran solution having a sample concentration of 0.4% by mass)
Standard sample: The following types of standard polystyrene were used to produce a calibration curve.
(Standard Polystyrene)
    "TSKgel standard polystyrene A-500", manufactured by Tosoh Corporation "TSKgel standard polystyrene A-1000", manufactured by Tosoh Corporation
"TSKgel standard polystyrene A-2500", manufactured by Tosoh Corporation
"TSKgel standard polystyrene A-5000", manufactured by Tosoh Corporation
"TSKgel standard polystyrene F-1", manufactured by Tosoh Corporation
"TSKgel standard polystyrene F-2", manufactured by Tosoh Corporation
"TSKgel standard polystyrene F-4", manufactured by Tosoh Corporation
"TSKgel standard polystyrene F-10", manufactured by Tosoh Corporation
"TSKgel standard polystyrene F-20", manufactured by Tosoh Corporation
"TSKgel standard polystyrene F-40", manufactured by Tosoh Corporation
"TSKgel standard polystyrene F-80", manufactured by Tosoh Corporation
"TSKgel standard polystyrene F-128", manufactured by Tosoh Corporation
"TSKgel standard polystyrene F-288", manufactured by Tosoh Corporation
"TSKgel standard polystyrene F-550", manufactured by Tosoh Corporation

[Method for Measuring Average Particle Diameter of Urethane Resin Composition]

The volume average diameters of the urethane resin compositions obtained in Examples and Comparative Example were measured as the average particle diameters thereof, by using a laser diffraction scattering measuring device (MICROTRAC UPA-EX150, manufactured by NIKKISO CO., LTD.), using water as a dispersion liquid, and letting solvent refractive index=1.33 and particle refractive index=1.51.

[Evaluation of Flexibility]

Test specimens were produced by cutting the gloves obtained in Examples and Comparative Example with the "dumbbell TYPE D" in accordance with ASTM D412. Each of the test specimens was held at both ends with chucks, and pulled using a tensile tester "Autograph AG-I" (manufactured by Shimadzu Corporation) at a crosshead speed of 500 mm/minute in an atmosphere with a temperature of 23±2° C. and a humidity of 60±10% to measure the 500% modulus (MPa) of the test specimen. At this time, a gauge length was 20 mm, and an initial chuck distance was 40 mm. Note that, when a value of the 500% modulus was 7 MPa or less, the test specimen was evaluated as excellent in flexibility.

[Evaluation of Chemical Resistance]

Test specimens were produced by cutting the gloves obtained in Examples and Comparative Example with the "dumbbell TYPE D", and immersed in 2-propanol for 24 hours. After that, the test specimens were taken out from 2-propanol and put between paper towels to lightly remove alcohol on surfaces of the test specimens. Immediately after that, the tensile strength (MPa) of each of the test specimens was measured under the same conditions as the above-mentioned conditions, by using a tensile tester "Autograph AG-I" (manufactured by Shimadzu Corporation). Note that a test specimen whose tensile strength could not be measured due to its poor chemical resistance was evaluated as "-". Note that, when the tensile strength of a test specimen was 0.5 MPa or more, the test specimen was evaluated as excellent in chemical resistance.

TABLE 1

| | | Example 1 | Example 2 | Example 3 | Example 4 | Example 5 | Comparative Example 1 |
|---|---|---|---|---|---|---|---|
| Urethane resin (AX) | Polyol (a1X) | | | | | | |
| | Polycarbonate polyol (a1-1) | PC | PC | PC | PC | PC | |
| | Polytetramethylene glycol (a1-2) | PTMG | PTMG | PTMG | PTMG | PTMG | PTMG |
| | Mass ratio (a1-1)/(a1-2) | 95/5 | 75/25 | 65/35 | 50/50 | 75/25 | 0/100 |
| | Compound (a1-3) | 3fPPG | 3fPPG | 3fPPG | 3fPPG | TMP | 3fPPG |
| | Polyisocyanate (a2X) | MDI | MDI | MDI | MDI | MDI | MDI |
| | Chain extender (a3X) | EG | EG | EG | EG | EG | EG |
| Evaluation of flexibility 500% modulus (MPa) | | 6.5 | 5.9 | 5.3 | 3.8 | 6.2 | 2.2 |
| Evaluation of chemical resistance Tensile strength (MPa) | | 1.1 | 0.9 | 0.6 | 0.5 | 0.5 | — |

TABLE 2

| | | Example 6 | Example 7 | Example 8 | Example 9 | Example 10 |
|---|---|---|---|---|---|---|
| Urethane resin (AY) | Polyol (a1Y) | | | | | |
| | Polycarbonate polyol (a1-1) | PC | PC | PC | PC | PC |
| | Compound (a1-2) | NPG | NPG | NPG | 1.3 BG | MPG |
| | Mass ratio (a1-1)/(a1-2) | 98.3/1.7 | 96.7/3.3 | 95.2/4.8 | 98.1/1.9 | 98.6/1.4 |
| | Polyisocyanate (a2X) | MDI | MDI | MDI | MDI | MDI |
| Evaluation of flexibility 500% modulus (MPa) | | 3.1 | 4.8 | 6.4 | 2.9 | 2.5 |
| Evaluation of chemical resistance tensile strength (MPa) | | 0.9 | 1.0 | 1.1 | 0.8 | 0.5 |

It was found that Examples 1 to 10, serving as the gloves according to the present invention, had flexibility and chemical resistance (in particular, alcohol resistance).

In contrast, Comparative Example 1, not including a polycarbonate polyol (a1-1), had poor chemical resistance.

The invention claimed is:

1. A glove having a coating formed of a urethane resin composition, the urethane resin composition including a urethane resin (A) and water (B), wherein the urethane resin (A) is produced using a polycarbonate polyol (a1-1) as a raw material, and the coating has a 500% modulus of 7 MPa or less; wherein the urethane resin (A) is a urethane resin (AX) produced using a polycarbonate polyol (a1-1) and polytetramethylene glycol (a1-2) as raw materials, and having a mass ratio [(a1-1)/(a1-2)] of 50/50 to 95/5, and/or a urethane resin (AY) produced using a polycarbonate polyol (a1-1) and a compound (a1-4) as raw materials, and having a mass ratio [(a1-1)/(a1-4)] of 93/7 to 99.5/0.5, the compound (a1-4) having a number average molecular weight of less than 500, a branched structure, and 2 to 4 hydroxyl groups.

2. The glove according to claim 1, wherein each of the urethane resin (AX) and the urethane resin (AY) is produced using an aromatic polyisocyanate.

3. The glove according to claim 1, wherein each of the urethane resin (AX) and the urethane resin (AY) is a urethane resin having an anionic group.

4. The glove according to claim 2, wherein each of the urethane resin (AX) and the urethane resin (AY) is a urethane resin having an anionic group.

* * * * *